United States Patent
Kim et al.

(10) Patent No.: US 9,161,177 B2
(45) Date of Patent: Oct. 13, 2015

(54) METHOD FOR TRANSMITTING AND RECEIVING MULTICAST-DATA-RELATED INFORMATION BY A MACHINE-TO-MACHINE (M2M) DEVICE IN A WIRELESS COMMUNICATION SYSTEM, AND APPARATUS THEREFOR

(75) Inventors: Jeongki Kim, Anyang-si (KR); Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

(21) Appl. No.: 14/001,484

(22) PCT Filed: Feb. 23, 2012

(86) PCT No.: PCT/KR2012/001400
§ 371 (c)(1),
(2), (4) Date: Sep. 25, 2013

(87) PCT Pub. No.: WO2012/115471
PCT Pub. Date: Aug. 30, 2012

(65) Prior Publication Data
US 2014/0010141 A1    Jan. 9, 2014

Related U.S. Application Data

(60) Provisional application No. 61/446,017, filed on Feb. 23, 2011, provisional application No. 61/483,717, filed on May 8, 2011, provisional application No. 61/486,782, filed on May 17, 2011, provisional application No. 61/536,075, filed on Sep. 19, 2011, provisional application No. 61/475,235, filed on Apr. 14, 2011.

(51) Int. Cl.
*H04H 20/71* (2008.01)
*H04W 4/06* (2009.01)
(Continued)

(52) U.S. Cl.
CPC .............. *H04W 4/06* (2013.01); *H04W 68/005* (2013.01); *H04W 76/002* (2013.01)

(58) Field of Classification Search
CPC .... H04W 4/06; H04W 76/002; H04W 68/005
See application file for complete search history.

(56) References Cited

U.S. PATENT DOCUMENTS

2005/0249140 A1    11/2005    Lee et al.
2009/0109926 A1     4/2009    Meylan
(Continued)

FOREIGN PATENT DOCUMENTS

CN         101583178        11/2009

OTHER PUBLICATIONS

Kim, et al., "Advanced Power Management Techniques in Next-Generation Wireless Networks," IEEE Communications Magazine, vol. 48, No. 5, May 2010, pp. 94-102.
(Continued)

*Primary Examiner* — Clemence Han
(74) *Attorney, Agent, or Firm* — Lee, Hong, Degerman, Kang & Waimey

(57) ABSTRACT

Disclosed is a method for transmitting and receiving multicast-data-related information by a machine-to-machine (M2M) device in a wireless communication system, and an apparatus therefor. The method for receiving multicast-data-related information by a machine-to-machine device according to one embodiment of the present invention comprises the following steps: receiving a first message including multicast traffic receiving timer information from a base station; receiving a paging message from the base station; and starting a multicast traffic receiving timer from the point in time indicated by the paging message or from the point in time of receiving the paging message, in accordance with the first message and the paging message. The multicast traffic receiving timer information may include information on a time interval during which the M2M device waits to receive the M2M multicast data in an idle mode.

17 Claims, 14 Drawing Sheets

(51) Int. Cl.
 *H04W 68/00* (2009.01)
 *H04W 76/00* (2009.01)

(56) References Cited

U.S. PATENT DOCUMENTS

| | | | |
|---|---|---|---|
| 2009/0303953 A1 | 12/2009 | Kang et al. | |
| 2010/0279676 A1 | 11/2010 | Benn et al. | |
| 2013/0242848 A1* | 9/2013 | Kim et al. | 370/312 |
| 2013/0244652 A1* | 9/2013 | Park et al. | 455/435.1 |
| 2013/0252643 A1* | 9/2013 | Park et al. | 455/458 |
| 2013/0260801 A1* | 10/2013 | Kim et al. | 455/458 |
| 2013/0301515 A1* | 11/2013 | Kim et al. | 370/312 |
| 2013/0310016 A1* | 11/2013 | Park et al. | 455/418 |
| 2013/0315129 A1* | 11/2013 | Kim et al. | 370/312 |

OTHER PUBLICATIONS

PCT International Application No. PCT/KR2012/001400, Written Opinion of the International Searching Authority dated Oct. 4, 2012, 14 pages.
The State Intellectual Property Office of the People's Republic of China Application U.S. Appl. No. 201280019790.7, Office Action dated Aug. 5, 2015, 5 pages.

* cited by examiner

METHOD FOR TRANSMITTING AND RECEIVING MULTICAST-DATA-RELATED INFORMATION BY A MACHINE-TO-MACHINE (M2M) DEVICE IN A WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2012/001400, filed on Feb. 23, 2012, which claims the benefit of U.S. Provisional Application Ser. Nos. 61/446,017, filed on Feb. 23, 2011, 61/475,235, filed on Apr. 14, 2011, 61/483,717, filed on May 8, 2011, 61/486,782, filed on May 17, 2011, and 61/536,075, filed on Sep. 19, 2011, the contents of which are all hereby incorporated by reference herein in their entirety.

TECHNICAL FIELD

The present invention relates to a wireless communication, and more particularly, to a method of transmitting/receiving multicast data-related information an apparatus therefor.

BACKGROUND ART

Generally, a machine-to-machine (hereinafter abbreviated M2M) communication literally means a communication between one electronic device and another electronic device. In a broad sense, the M2M communication may mean a wire/wireless communication between electronic devices or a communication between a human-controllable device and a machine. Recently, the M2M communication may generally indicate a communication between electronic devices, i.e., a device-to-device wireless communication performed without human involvement.

In the early 1990's, in which the concept of the M2M communication has been initially introduced, the M2M communication has been recognized as remote control or telematics or the like and derivative markets of the M2M communication were very limitative. Yet, the M2M communication has grown rapidly for past few years and has become the globally noteworthy markets. Specifically, in POS (point of sales) and security related application markets, the M2M communication has considerably influence on such field as fleet management, remote monitoring of machinery and equipment, smart meter for auto-measurement of operating time, consumed heat or electricity quantity on construction machinery equipment and the like. M2M communication in the future will be further utilized for various usages in connection with a small-scale output communication solution such as conventional mobile communication, wireless high-speed internet, Wi-Fi, ZigBee and the like and may lay the foundation of expansion to B2C (business to consumer) markets instead of being confined to B2B (business to business) markets.

In the era of the M2M communication, every machine equipped with SIM (subscriber identity module) card enables data transmission and reception and is capable of remote management and control. For instance, as M2M communication technology is usable for numerous devices and equipment including vehicles, trucks, trains, containers, auto-vending machines, gas tanks and the like, its application fields may reach far and wide.

According to a related art, since mobile stations are managed by individual unit in general, a communication between a base station and a mobile station is usually performed by a one-to-one communication scheme. Assuming that numerous M2M devices communicate with a base station by the one-to-one communication scheme, network may be overloaded due to the occurrence of signaling between the base station and each of the numerous M2M devices. As mentioned in the above description, in case that the M2M communications are rapidly spreading across a wider scope, overheads due to the communications between the M2M devices or the communications between the base station and the M2M devices may cause problems.

Meanwhile, there exists a necessity for a base station to transmit a multicast data to M2M devices. However, a method for a base station to efficiently transmit multicast-related information in consideration of the properties of the M2M devices has not been proposed in detail yet.

DISCLOSURE OF THE INVENTION

Technical Tasks

One object of the present invention is to provide a method for an M2M device to receive multicast data-related information in a wireless communication system.

Another object of the present invention is to provide an M2M device capable of receiving multicast data-related information in a wireless communication system.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve the aforementioned technical task and in accordance with the purpose of the invention, as embodied and broadly described herein, according to the present invention a method of receiving a multicast data-related information by a machine to machine (M2M) device in a wireless communication system, the method includes receiving a first message including a multicast traffic reception timer information from a base station, receiving a paging message from the base station, and starting a multicast traffic reception timer from a timing point indicated by the paging message or a timing point on which the paging message is received based on the first message and the paging message, wherein the multicast traffic reception timer information may include information on a time interval for which the M2M device waits to receive the M2M multicast data. The first message may correspond to a message for requiring a dynamic service addition or a message for requiring a dynamic service change. The message for requiring the dynamic service addition may correspond to an AAI-DSA-REQ message or a DSA-REQ message and the message for requiring the dynamic service change may correspond to an AAI-DSC-REQ message or a DSC-REQ message. If the multicast traffic reception timer is expired, the M2M device can enter a paging unavailable interval of idle mode.

The timing point indicated by the paging message may correspond to a timing point on which the multicast data is received. The method may further include receiving a multicast data from the base station and restarting or resetting the multicast traffic reception timer according to the multicast data reception.

Selectively, the method may further include receiving a multicast data from the base station, receiving an indicator indicating a transmission end of the multicast data from the base station, and stopping multicast traffic reception timer before the multicast traffic reception timer is expired based on the indicator. The multicast data may correspond to a connection identical to a multicast connection, which is mapped to the multicast traffic reception timer. The M2M device may enter a paging unavailable interval of an idle mode after stopping the multicast traffic reception timer.

To further achieve the aforementioned different technical task and in accordance with the purpose of the invention, as embodied and broadly described herein, according to one embodiment of the present invention, a machine to machine (M2M) device of receiving a multicast data-related information in a wireless communication system, the M2M device includes a receiver configured to receive a first message including a multicast traffic reception timer information and a paging message from a base station and a processor configured to control a multicast traffic reception timer, to start from a timing point indicated by the paging message or a timing point on which the paging message is received, based on the first message and the paging message, wherein the multicast traffic reception timer information can include information on a time interval for which the M2M device waits to receive the M2M multicast data. The first message may correspond to a message for requiring a dynamic service addition or a message for requiring a dynamic service change. The message for requiring the dynamic service addition may correspond to an AAI-DSA-REQ message or a DSA-REQ message and the message for requiring the dynamic service change may correspond to an AAI-DSC-REQ message or a DSC-REQ message. The receiver is configured to receive a multicast data from the base station and the processor is configured to control the multicast traffic reception timer to be restarted or reset according to the multicast data reception.

In the M2M device, the receiver is configured to receive an indicator indicating a multicast data and a transmission end of the multicast data from the base station, respectively and the processor is configured to stop multicast traffic reception timer before the multicast traffic reception timer is expired based on the indicator. The multicast data may correspond to a connection identical to a multicast connection, which is mapped to the multicast traffic reception timer and the processor is configured to control the M2M device to enter a paging unavailable interval of an idle mode after stopping the multicast traffic reception timer.

Advantageous Effects

According to various embodiments of the present invention, M2M devices efficiently receive multicast data-related information. In particular, the M2M devices in an idle mode consume low electricity, whereby power saving effect exists and communication performance is enhanced.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
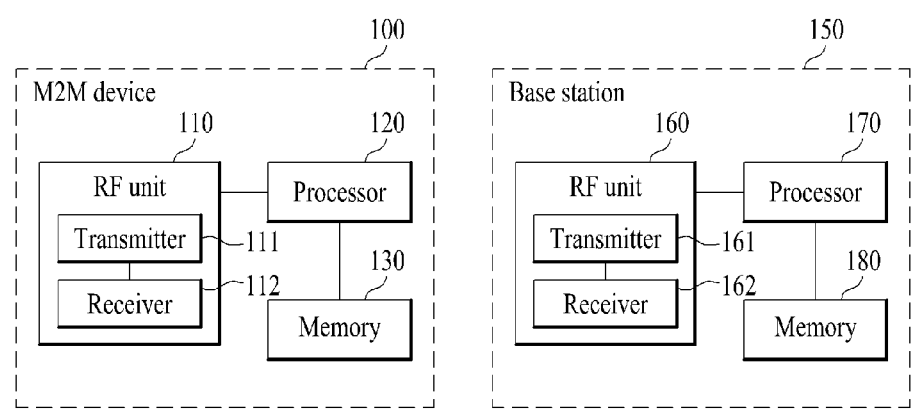
FIG. 1 is a schematic diagram for configurations of an M2M device and a base station according to one embodiment of the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. Detailed description disclosed together with the accompanying drawings is intended to explain not a unique embodiment of the present invention but an exemplary embodiment of the present invention. For instance, although the following descriptions are made in detail on the assumption that a mobile communication system includes IEEE (institute of electrical and electronics engineers) 802.16 system, they are applicable to other random mobile communication systems except unique features of IEEE 802.16 system.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station is a common name of such a random node of a network stage communicating with a terminal as a Node B, an eNode B, a base station (BS), an access point (AP) and the like.

In a mobile communication system, a mobile station may be able to receive information in downlink from a base station and transmit information in uplink to the base station. The informations transmitted or received by the mobile station may include data and various control informations. And, various kinds of physical channels may exist in accordance with types and usages of the informations transmitted or received by the mobile station.

In the following description, an M2M communication may mean information exchange performed between mobile stations or between a base station and each of mobile stations without human involvement. Hence, the M2M device may mean a mobile station capable of supporting the above-mentioned M2M device communication. An access service network for an M2M service may be defined as an M2M ASN (M2M access service network) and a network entity performing communications with M2M devices may be named an M2M server. In particular, the M2M server activates an M2M application and provides an M2M-specific service for at least one or more M2M devices. An M2M feature indicates a feature of an M2M application. And, at least one feature may be necessary to provide an application. An M2M device group may mean a group of M2M devices that share at least one common feature with each other.

The devices performing communications by M2M scheme may be variously named M2M devices, M2M communication devices, MTC (machine type communication) devices and the like. And, the number of the devices will increase gradually as the number of machine application types does. The currently discussed machine application types may include (1) security, (2) public safety, (3) tracking and tracing, (4) payment, (5) healthcare, (6) remote maintenance and control, (7) metering, (8) consumer device, (9) POS (Point Of Sales) and fleet Management in security related market, (10) M2M communication of vending machine (11) smart meter for plant and machinery remote monitoring, operating time measurement on measurement on construction plant and machinery and auto-measurement of consumed heat or electricity quantity on construction plant and machinery, (12) surveillance video communication and the like, by which the machine application types may be non-limited. And, there are ongoing discussions on other machine application types.

According to properties of M2M devices, the M2M device may have low mobility or no mobility. If a prescribed M2M device has considerably low mobility or does not have mobility at all, it may mean that the corresponding M2M device is stationary in the long term. An M2M communication system may be able to simplify or optimize mobility related operations for a specific M2M application related to such an M2M device having a stationary location as an M2M device for secured access and surveillance, an M2M device for public safety, an M2M device for payment, an M2M device for remote maintenance and control, an M2M device for metering and the like.

As mentioned earlier in the foregoing description, the number of the M2M communication devices will increase rapidly compared to the number of general mobile communication devices as the number of machine application types increases. Hence, in case that all of the communications devices are individually perform communication with a base station, serious overhead can be given to a wireless interface and a network.

In the following description, an embodiment of the present invention is explained with reference to a case of applying M2M communication to a wireless communication system (e.g., IEEE 802.16e/m), by which the present invention may be non-limited. And, an embodiment of the present invention is applicable to such a different wireless communication system as 3GPP LTE system and the like in the same manner.

FIG. 1 is a schematic diagram for configurations of an M2M device and a base station according to one embodiment of the present invention.

Referring to FIG. 1, an M2M device 100, which may be named an M2M communication device but will be named as an M2M device in the following, may include an RF unit 110, a processor 120 and a memory 130. In this case, the memory 130 is an optional component. And, a base station 150 may include an RF unit 160, a processor 170 and a memory 180. In this case, the memory 180 is an optional component. The RF unit 110/160 may include a transmitter 111/161 and a receiver 112/162. For example of the M2M device 100, the transmitter 111 is configured to transmit signals to the base station 150 and other M2M devices. And, the receiver 112 is configured to receive signals from the base station 150 and other M2M devices. The processor 120 can be configured to control the transmitter 111 and the receiver 112 to transmit/receive a signal with different devices in a manner of being functionally connected to the transmitter 111 and the receiver 112. The processor 120 performs various processings of a signal to transmit and then transfers the processed signal to the transmitter 111. And, the processor 120 may process a signal received by the receiver 112. If necessary, the processor 120 may store information contained in an exchanged message in the memory 130. The above-configured M2M device 100 may perform various methods according to embodiments of the present invention mentioned in the following description. Besides, the M2M device 100 may further include various kinds of additional components (not shown in FIG. 1) according to its machine application type. In case that the corresponding M2M device 100 is provided for the smart meter, it may further include an additional configuration for power measurement and the like. This power measuring operation may be under the control of the processor 120 shown in FIG. 1 or a separately configured processor (not shown in the drawing).

Although FIG. 1 shows a case that a communication is performed between the M2M device 100 and the base station 150 for example, an M2M communication method according to the present invention may be performed between M2M devices. In particular, each of the M2M devices may have the same device configurations shown in FIG. 1 to perform various methods according to embodiments of the present invention mentioned in the following description.

The transmitter 161 of the base station 150 is configured to transmit signals to another base station, an M2M server and M2M devices. And, the receiver 162 of the base station 150 is configured to receive signals from another base station, an M2M server and M2M devices. The processor 170 is functionally connected to each of the transmitter 161 and the receiver 162 to control a process for the transmitter 161 and the receiver 162 to transceive signals with other devices. The processor 170 performs various kinds of processings on a signal to transmit and then transfers the processed signal to the transmitter 161. And, the processor 170 may be able to perform processing on a signal received by the receiver 162. If necessary, the processor 170 may store information contained in an exchanged message in the memory 180. The above-configured base station 150 may perform various methods according to embodiments of the present invention mentioned in the following description.

The processor 120 of the M2M device 100 directs operations (e.g., control, adjustment, management, etc.) in the M2M device 100. The processor 170 of the base station directs operations (e.g., control, adjustment, management, etc.) in the base station 150. The processor 120/170 may be connected to the memory 130/180 configured to store program codes and data. The memory 130/180 is connected to the processor 120/170 to store operating systems, applications and general files.

The processor 120/170 may be named one of a controller, a microcontroller, a microprocessor, a microcomputer and the like. Moreover, the processor 120/170 may be implemented by hardware, firmware, software or a combination thereof. In case of implementing an embodiment of the present invention using hardware, the processor 120/170 may be provided with such a configuration to perform the present invention as ASICs (application specific integrated circuits), DSPs (digital signal processors), DSPDs (digital signal processing devices), PLDs (programmable logic devices), FPGAs (field programmable gate arrays), and the like.

In case of implementing embodiments of the present invention using firmware or software, the firmware or software may be configured to include modules, procedures, and/or functions for performing the functions or operations of the present invention. And, the firmware or software configured to perform the present invention may be driven by the processor 120/170 in a manner of being installed at the processor 120/170 or being saved in the memory 130/180.

In the following description, an idle mode may indicate a mode for managing a paging group approved by a base station, a paging cycle, a paging offset via a signaling between a mobile station and the base station to save power of the mobile station. In particular, although the mobile station is wandering around a radio link environment where a plurality of base stations are positioned across an area of a wide range, an idle mode is a mechanism for the mobile station capable of periodically receiving a downlink broadcast message without registering a specific base station.

The idle mode stops all normal operations as well as a handover (HO) and corresponds to a state that downlink synchronization is set only to receive a paging message, which is a broadcast message, in a certain section only. The paging message is a message indicating a paging action to a mobile station. For instance, the paging action includes a ranging performance, a network reentry, and the like.

An idle mode can be initiated by a mobile station or a base station. In particular, the mobile station can enter the idle mode by transmitting a registration cancellation request (DREG-REQ) message to the base station and receiving a registration cancellation response (DREG-RSP) message from the base station in response to the registration cancellation request (DREG-REQ) message. And, the mobile station can enter the idle mode in a manner that the base station transmits a not-requested registration cancellation response (DREG-RSP) message or a registration cancellation command (DREG-CMD) message to the mobile station.

In case that the mobile station receives a paging message (paging message) corresponding to the mobile station during an available interval (AI) in an idle mode, the mobile station converts a mode of the mobile station into a connected mode via a network entry process and transceives a data with the base station.

In general, when a mobile station moves around a radio link environment configured with multiple base stations, an idle state or an idle mode operation indicates an operation for supporting the mobile station to periodically transmit downlink broadcast traffic although the mobile station does not register a specific base station. If the mobile station does not receive traffic from the base station for a prescribed time period, the mobile station can shift to an idle state to save power. Having shifted to the idle state, the mobile station can judge whether to shift to a normal mode or to stay in the idle state in a manner of receiving a broadcasting message (e.g., a paging message) during the available interval (AI).

An idle state can give a benefit to the mobile station in a manner of eliminating an activation request related to a handover and general management requests. The idle state restricts an activity of the mobile station to scan in a discrete period and can make power and an operation resource used by the mobile station to be saved. And, the idle state provides a simple and proper scheme capable of informing the mobile station of downlink traffic, which is in a status of being pended, and can give a benefit to a network and a base station in a manner of eliminating radio interface and network handover traffic from an inactive mobile station.

A paging indicates a function to identify a position (e.g., a base station or an exchange office) of a corresponding mobile station when an incoming call occurs in a mobile communication. A plurality of base stations supporting an idle state or an idle mode can configure a paging region in a manner of belonging to a specific paging group. In this case, the paging group indicates a logical group. A purpose of the paging group is to provide an adjacent range region capable of being paged on a downlink if there is traffic for targeting a mobile station. It is preferable to configure the paging group to satisfy a condition that the paging group is large enough for a specific mobile station to stay most of time in the identical paging group and a condition that the paging group is small enough for a paging load to be maintained in an appropriate level.

The paging group may include one or more base stations and one base station can be included in one or more paging groups. The paging group is defined by a management system. In the paging group, a paging group-action backbone network message can be used. And, a paging controller manages a list of the mobile stations in an idle state using a paging announce message, which is one of the backbone network messages, and can manage an initial paging of all base stations to which belong the paging group.

For clarity, a paging in an idle mode is described on the basis of IEEE 802.16 system, by which the technical idea of the present invention may be non-limited to this. In order to enter the idle mode, a mobile station transmits a registration cancellation request (DREG-REQ) message to a base station to make a request for a registration cancellation with the base station. Subsequently, the base station transmits a registration cancellation response (DREG-RSP) message to the mobile station in response to the DREG-REQ message. In this case, the DREG-RSP message includes paging information. In this case, entering the idle mode of the mobile station can be initiated by the request of the base station. In this case, the base station transmits the DREG-RSP message to the mobile station.

The paging information can include a paging cycle, a paging offset, a paging group identifier (PGID), a paging listening interval (paging listening interval) value, and the like.

Having received the DREG-RSP message from the base station, the mobile station enters the idle mode with reference to the paging information. The idle mode includes a paging cycle and one paging cycle can consist of an available interval and an unavailable interval. In this case, the available interval is a concept identical to the paging listening interval or the paging interval. The paging offset is used to indicate a timing point (as an example, a frame or a subframe) where the paging interval begins in the paging cycle. And, the paging group identifier indicates an identifier of a paging group assigned to the mobile station. And, the paging information can include paging message offset (paging message offset) information. In this case, the paging message offset information indicates a timing point of which a paging message is transmitted from the base station. And then, the mobile station can receive a paging message delivered to the mobile station using the paging information in the available interval (or paging listening interval). In this case, the paging message can be transmitted via the base station or the paging controller. In particular, the mobile station monitors a radio channel according to the paging cycle to receive a paging message.

A mobile station in an idle mode checks whether there is a downlink (DL) data delivered to the mobile station in a manner of receiving a paging message in a paging listening interval of the mobile station. If there is a downlink data (i.e., positive indication), the mobile station performs a network reentry process including a ranging process. Thereafter, the mobile station performs a process of establishing a connection for a related downlink service flow via a DSA (Dynamic Service Addition) process. After the connection for the service flow is established, the base station transmits a downlink data for a corresponding service to the mobile station.

For clarity, following description is described on the basis of IEEE 802.16e, 16m, 16p system, by which the technical idea of the present invention may be non-limited to this.

In order to enter the idle mode, a mobile station transmits a registration cancellation request (DREG-REQ) message to a base station to make a request for a registration cancellation with the base station. Subsequently, the base station transmits a registration cancellation response (DREG-RSP) message to the mobile station in response to the DREG-REQ message. In this case, the DREG-RSP message includes paging information. In this case, entering the idle mode of the mobile station can be initiated by the request of the base station. In this case, the base station transmits the DREG-RSP message to the mobile station.

The paging information can include a paging cycle, a paging offset, a paging group identifier (PGID), a paging listening interval (paging listening interval) value, and the like. Having received the DREG-RSP message from the base station, the mobile station enters the idle mode with reference to the paging information.

The idle mode includes a paging cycle and one paging cycle can consist of an available interval and an unavailable interval. In this case, the available interval is a concept identical to the paging listening interval or the paging interval. The paging offset is used to indicate a timing point (as an example, a frame or a subframe) where the paging interval begins in the paging cycle. And, the paging group identifier indicates an identifier of a paging group assigned to the mobile station. And, the paging information can include paging message offset (paging message offset) information. In this case, the paging message offset information indicates a timing point of which a paging message is transmitted from the base station.

Subsequently, the mobile station can receive a paging message delivered to the mobile station using the paging information in the available interval (i.e., paging listening interval). In this case, the paging message can be transmitted via the base station or the paging controller. In particular, the mobile station monitors a radio channel according to the paging cycle to receive a paging message.

Figure 2:
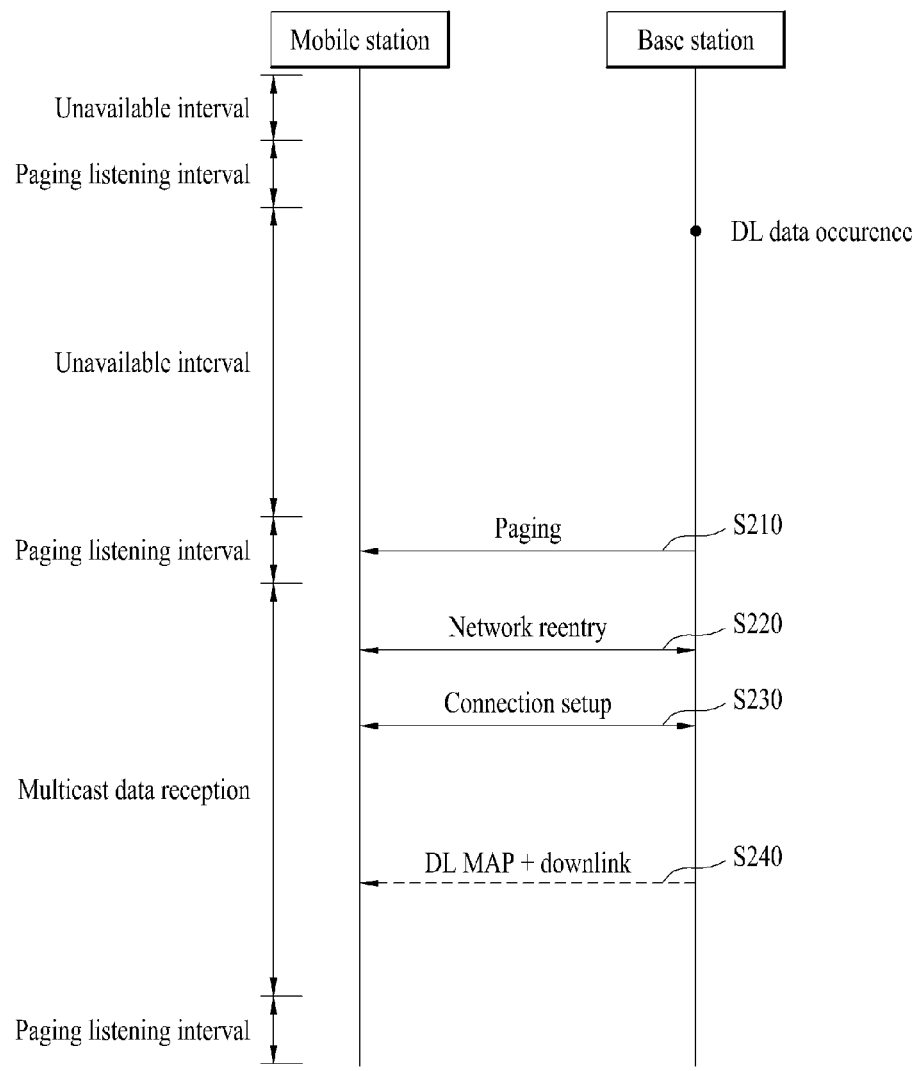
FIG. 2 is a flowchart of a paging procedure in an idle mode.

FIG. 2 is a flowchart of a paging procedure in an idle mode.

A mobile station in an idle mode checks whether there is a downlink (DL) data delivered to the mobile station by receiving a paging message in a paging listening interval of the mobile station [S210]. If there is a downlink data (i.e., positive indication), the mobile station performs a network reentry process including a ranging process [S220]. Thereafter, the mobile station performs a process of establishing a connection for a related downlink service flow via a DSA (Dynamic Service Addition) process [S230]. After the connection for the service flow is established, the base station transmits downlink control information for a corresponding service and a downlink data to the mobile station [S240].

In an M2M scenario, since most of M2M devices are not such a legacy terminal carried by a user as a cellular phone, an automatic application for M2M devices or a firmware update process can be a primary application in the M2M service scenario. For instance, an M2M server can transmit update information to the M2M devices including a corresponding application to update a firmware of each of the devices. In order to transmit a multicast data, which is necessary to be commonly sent to a plurality of mobile stations, to the M2M devices in an idle mode, a base station according to embodiment of FIG. 2 will page the corresponding M2M devices. Having received the paging, the mobile stations access a network by starting to transmit a random access code and performing a network reentry process and receive downlink traffic transmitted from the base station. The aforementioned processes increase unnecessary resource use of the network and increase power consumption of mobile stations.

In order to solve the aforementioned problem, the present invention provides a method for an M2M device in an idle mode to efficiently receive a multicast data using a paging method, when the multicast data, which is generated by an event triggered scheme, is transmitted to the mobile station in the idle mode in an M2M communication.

Figure 3:
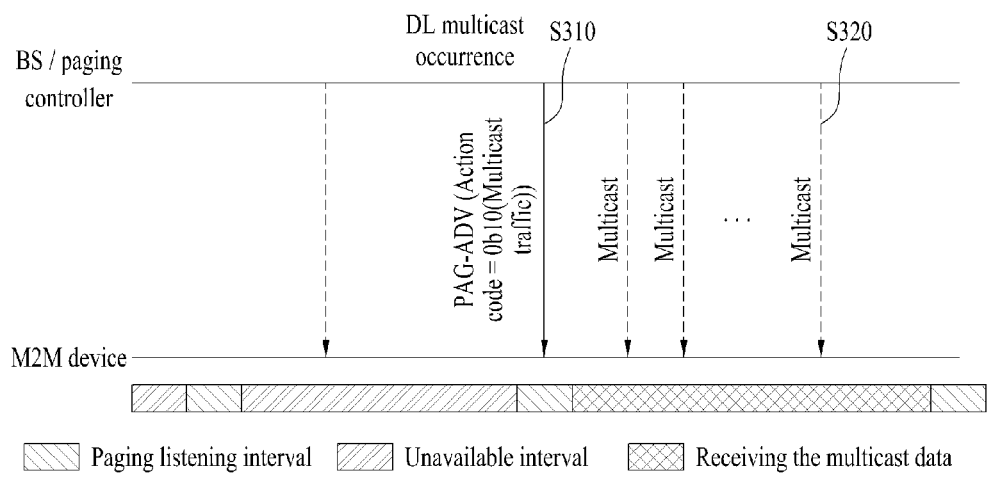
FIG. 3 is a diagram of an example of a multicast data transmission between an M2M device and a base station according to one embodiment of the present invention.

FIG. 3 is a diagram of an example of a multicast data transmission between an M2M device and a base station according to one embodiment of the present invention.

Referring to FIG. 3, before an M2M multicast data is transmitted to an M2M device by a base station, the base station transmits a paging message including a multicast traffic indication (i.e., indicating that a multicast data is transmitted) in a paging listening interval of the M2M devices [S310]. In this case, an action code of the paging message indicates the multicast traffic indication (e.g., 0b10) and includes a corresponding M2M group identifier (MGID). When the M2M device receives the paging message, the M2M device checks whether an M2M group ID, which is assigned to the M2M device in advance, is included in a group paging part of the paging message. If the MGID assigned to the M2M device is included in the paging message and a corresponding action code is 0b10, a processor 120 of the M2M device judges that multicast traffic (data) will be transmitted to a group indicated by the MGID and can control the M2M device to standby to receive the multicast traffic without terminating an idle mode. In this case, the processor 120 of the M2M device controls to perform an operation (downlink control channel and multicast data decoding) of receiving the multicast data in an unavailable interval of the M2M device as well.

If the base station cannot immediately transmit the multicast data after the paging message is transmitted, the base station can transmit the paging message in a manner of including information on a multicast transmission start time (MTST) for a corresponding M2M group ID (MGID) in the paging message.

When the M2M devices receive the paging message (e.g., AAI-PAG-ADV message) in the paging listening interval of the M2M devices, the processor 120 of the M2M device checks whether there exist a multicast traffic indication (action code=0b10) and an M2M group ID (MGID) assigned to the M2M device. If the multicast traffic indication indicating that the multicast traffic is transmitted is included in the paging message, the processor 120 of the M2M device checks whether the information on a multicast transmission start time (MTST) is included in the paging message. If the information on a multicast transmission start time (MTST) is included in the paging message, the processor 120 of the M2M device can control to perform a power down operation to reduce power consumption until a frame indicated by the multicast transmission start time (MTST). In particular, the processor 120 of the M2M device controls to perform an operation of receiving the multicast data from the frame indicated by the MTST. The M2M device receives the multicast data in the frame indicated by the MTST [S320].

Table 1 is a table for showing an example of the paging message (e.g., AAI-PAG-ADV) format.

TABLE 1

| Fields | Size | Value | Condition |
|---|---|---|---|
| ... | ... | ... | ... |
| For (i=0; i<Num_MGID; i++) { | | Num_MGID indicates the number of MGIDs included in this paging message [0 . . . 63] | |
| MGID | 12 | M2M Group ID | |
| Action Code | 2 | 0b00: Performing network reentry<br>0b01: Performing location update<br>0b10: Receiving multicast traffic<br>0b11: reserved | |
| If (Action code == 0b10) { | | | |
| multicast transmission start time (MTST) | 8 | Least Significant 8 bits of the frame number in which the ABS starts ending DL multicast data. | Shall be present when the MTST needs to be included in this message |
| } | | | |
| ... | ... | ... | |
| } | | | |
| ... | ... | ... | ... |

Referring to Table 1, the paging message includes an action code indicating a network reentry, location update, multicast traffic reception, or the like. In case of the action code 0b10 for indicating the multicast traffic reception, the paging message can include a field of a multicast transmission start time (MTST), which is information on the start time of multicast transmission. The multicast transmission start time is the information on the time (a frame, a subframe, or a superframe unit) of which the base station starts to transmit a multicast to the M2M device. As an example, the MTST field is 8-bit in size and can indicate a least significant bit (LSB) of a frame number, which starts to transmit a downlink multicast data.

Figure 4:
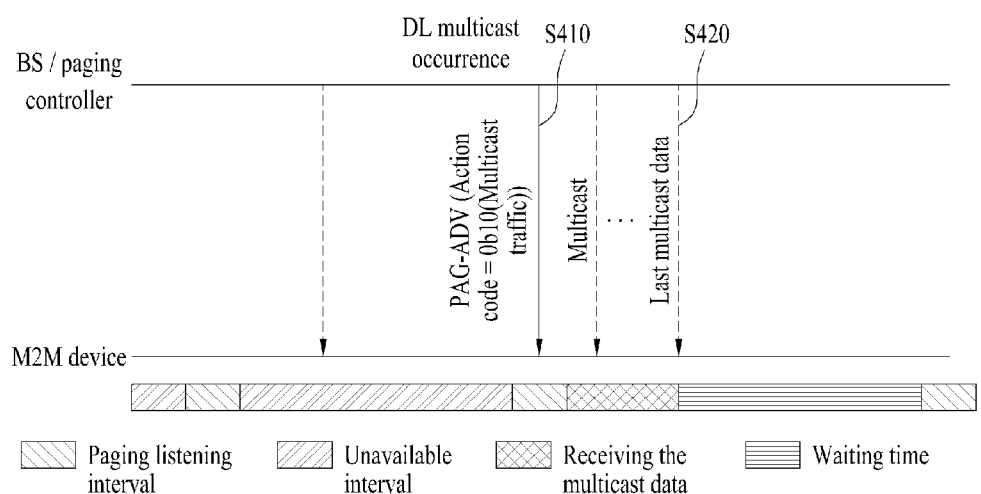
FIG. 4 is a diagram of a different example of a multicast data transmission between an M2M device and a base station according to one embodiment of the present invention.

FIG. 4 is a diagram of a different example of a multicast data transmission between an M2M device and a base station according to one embodiment of the present invention.

As mentioned earlier, the M2M device in an idle mode can receive a multicast traffic indicator (e.g. action code=0b10) indicating a multicast traffic transmission and a paging message including group information (e.g., M2M group ID) where the multicast traffic (or multicast data) is received from a base station [S410]. In this case, if the received M2M group ID information corresponds to the group where the M2M device belongs, the processor 120 of the M2M device controls the M2M device to standby to receive the multicast traffic without a network reentry and the M2M device can receive the multicast traffic [S420].

In this scenario, since the M2M device does not know when the base station stops transmitting the multicast data, it is necessary for the M2M device to perform an operation of receiving the multicast data until a next paging listening interval. If the multicast data corresponds to such a small data in size as a firmware update, time taken for the base station to practically transmit the multicast data is not that long. This only causes a problem of increasing power consumption of the M2M device in an idle mode. In particular, in case that the base station transmits a small multicast data immediately after the base station has paged, the processor 120 of the M2M device controls the M2M device to wait (or standby) until a next paging listening interval.

And, according to the characteristic of the M2M device, a long paging cycle can be applied to a specific M2M device. In this case, the increase range of power consumption of the M2M device will increase more and more. For instance, maximum paging cycle of a legacy IEEE 802.16m system is 512 superframe and the maximum value of the paging cycle of a system (e.g., IEEE 802.16p system) for the M2M device can be defined as 4194304 superframe for example.

In order to solve the aforementioned problem of unnecessary power consumption of the M2M device, it is explained with reference to FIG. 5 in the following description.

Figure 5A:
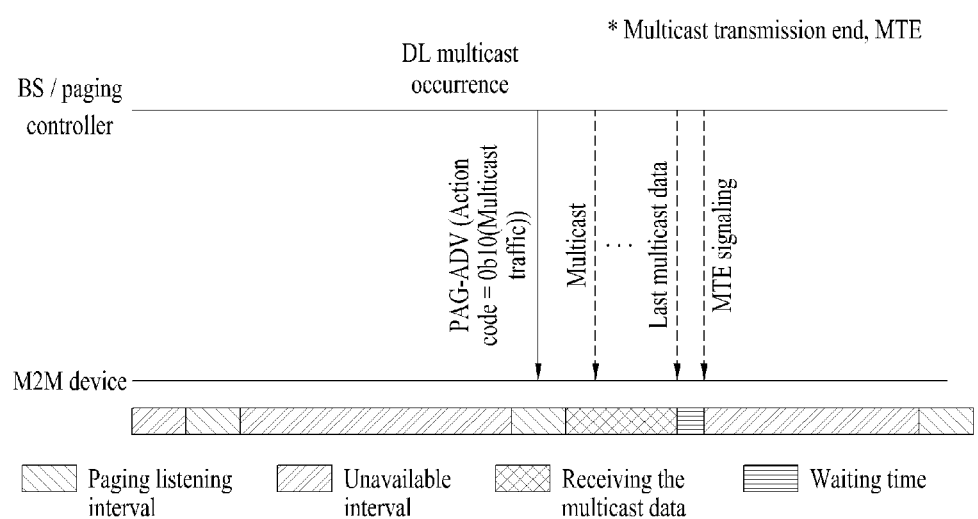
FIG. 5a and FIG. 5b is a diagram of a different example of a multicast data transmission between an M2M device and a base station according to one embodiment of the present invention.
Figure 5B:
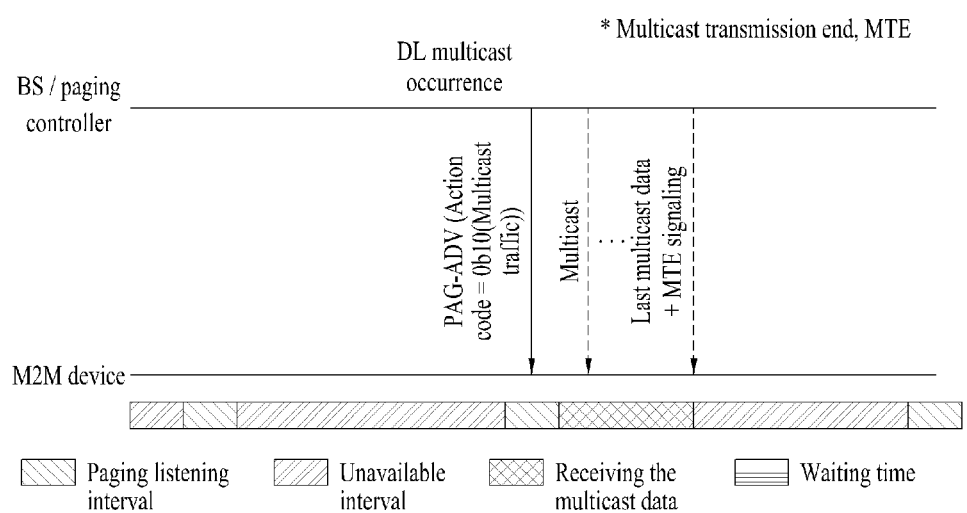

FIG. 5a and FIG. 5b is a diagram of a different example of a multicast data transmission between an M2M device and a base station according to one embodiment of the present invention.

Referring to FIG. 5a and FIG. 5b, the M2M device in an idle mode can receive a multicast traffic indicator (e.g. action code=0b10) indicating a multicast traffic transmission and a paging message including group information (e.g., M2M group ID) where the multicast traffic (or multicast data) is received from a base station. In this case, if the received M2M group ID information corresponds to the group where the M2M device belongs, the processor 120 of the M2M device controls the M2M device to standby to receive the multicast traffic without a network reentry and the M2M device can receive the multicast traffic.

The base station can transmit a multicast transmission end (MTE) signal under a condition as follows.

1) Condition 1: The base station has a last data for a corresponding multicast group/multicast connection in a transmission buffer (Tx buffer) of the base station.

2) Condition 2: The base station receives a signal indicating that a data transmission for a corresponding multicast group/multicast connection is ended from an entity of a network.

3) Condition 3: After a data for a specific multicast group is transmitted to the M2M device by the base station, the base station does not receive the data belonging to a same group from a network in a specific time period. In particular, the transmission buffer (Tx buffer) does not have a same multicast data for the specific time period.

As depicted in FIG. 5a, when the base station judges that the multicast data transmission is completed, the base station can separately transmit a signal (e.g., an MTE (multicast transmission end) signal) indicating the end of the multicast data transmission to the M2M device. If the M2M device in the idle mode receives the signal indicating the end of the multicast data transmission from the base station while receiving the multicast data, the processor 120 of the M2M device can perform an operation of reducing power consumption in a manner of immediately entering a paging unavailable interval.

In case of the condition 1, as depicted in FIG. 5b, the base station can transmit the MTE signal together with a last data to the M2M device when the base station transmits the last data to the buffer of the base station. In case of the condition 2, if the base station receives the multicast data from the network entity together with the signal indicating the end of the data transmission, the base station can transmit the MTE signal to the M2M device together when the base station transmits a corresponding multicast data. As mentioned in the foregoing description, in case that the base station transmits the MTE signal together with the multicast data, the base station can transmit the MTE signal in a manner of piggybacking to the multicast data or being concatenated to the multicast data. In case of transmitting the MTE signal in a manner of piggybacking to the multicast data, the MTE signal can be transmitted by a sub-header format or an extended header format.

Figure 6:
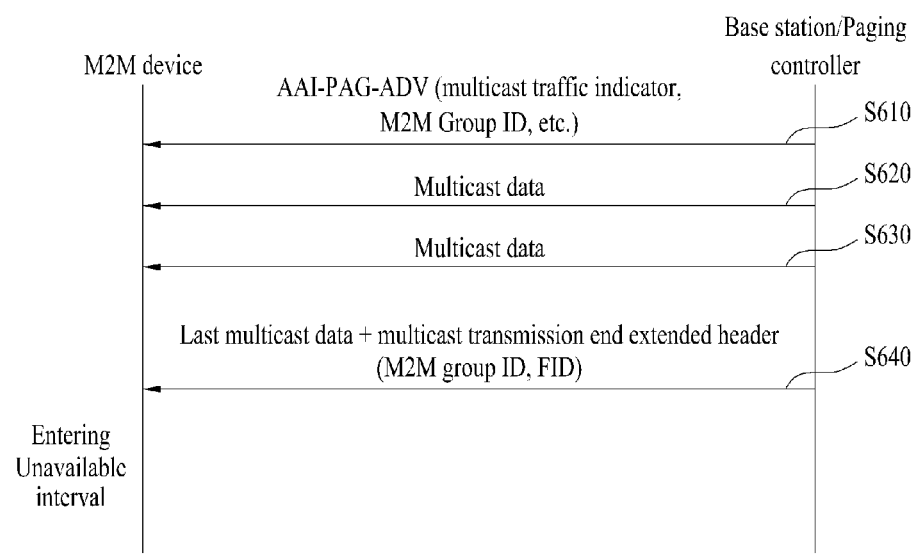
FIG. 6 is a diagram of a different example of a multicast data transmission between an M2M device and a base station according to one embodiment of the present invention.

FIG. 6 is a diagram of a different example of a multicast data transmission between an M2M device and a base station according to one embodiment of the present invention.

Referring to FIG. 6, the M2M device in an idle mode can receive a multicast traffic indicator (e.g. action code=0b10) indicating a multicast traffic transmission and a paging message including group information (e.g., M2M group ID) where the multicast traffic (or multicast data) is received from a base station [S610]. In this case, if the received M2M group ID information corresponds to the group where the M2M device belongs, the processor 120 of the M2M device controls the M2M device to standby to receive the multicast traffic without a network reentry and the M2M device can receive the multicast traffic [S620 to S630]. Thereafter, the base station can transmit a last data and a signal (e.g., MTE (multicast transmission end)) indicating the end of the multicast data transmission together to the M2M device [S640]. In this case, the MTE signal can be transmitted by a multicast transmission end extended header (MTEEH) format shown in Table 2. The following Table 2 shows an example of the MTEEH format.

TABLE 2

| Syntax | Size (bits) | Description/Notes |
| --- | --- | --- |
| Type | 4 | |
| M2M Group ID | 15 | M2M group ID |
| FID | 4 | Flow ID for Multicast connection |
| Idle mode resuming Start Frame | 4 | Least Significant 4 bits of the frame number in which the devices resumes the idle mode by using the previous idle mode parameters |

Referring to Table 2, the MTEEH format indicates the end of the multicast transmission via a type field. In order to indicate where the multicast information belongs, the MTEEH format can include at least one of an M2M group ID for a related multicast connection, an FID, and the like. And, the MTEEH format can include idle mode resuming start frame information indicating when the M2M device can resume an idle mode using a previous idle mode parameter after receiving the MTEEH. In particular, when a frame indicated by the idle mode resuming start frame field uses the previous idle mode parameter, if the frame is in the paging unavailable interval, the M2M device can perform an operation of reducing power consumption in a manner of entering the unavailable interval to reduce power consumption. If the idle mode resuming start frame information is not included, the M2M device immediately enters the unavailable interval. In this case, the idle mode resuming start frame field can indicate a lowest bit (e.g., 4 bits) of a frame number of the M2M device that resumes the idle mode by using the previous idle mode parameters.

In IEEE 802.16e system, the MTEEH can be used as a sub-header form (i.e., MTE sub-header) or an extended sub-header (i.e., MTE extended sub-header) and the information entering in a manner of being included may be similar to each other. In this case, CID (connection identifier) is included instead of the FID.

Figure 7:
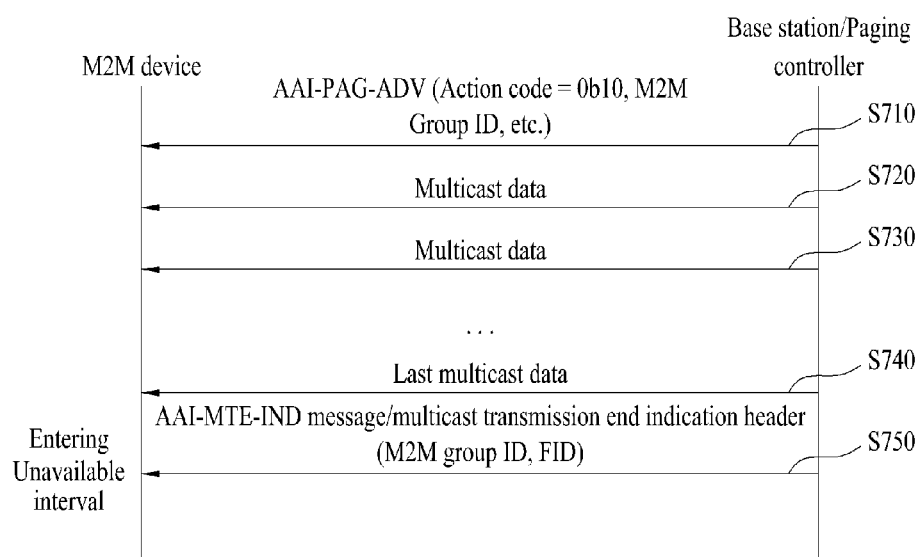
FIG. 7 is a diagram of a different example of a multicast data transmission between an M2M device and a base station according to one embodiment of the present invention.

FIG. 7 is a diagram of a different example of a multicast data transmission between an M2M device and a base station according to one embodiment of the present invention.

Referring to FIG. 7, the M2M device in an idle mode can receive a multicast traffic indicator (e.g. action code=0b10) indicating a multicast traffic transmission and a paging message including group information (e.g., M2M group ID) where the multicast traffic (or multicast data) is received from a base station [S710]. In this case, if the received M2M group ID information corresponds to the group where the M2M device belongs, the processor 120 of the M2M device controls the M2M device to standby to receive the multicast traffic without a network reentry and the M2M device can receive the multicast traffic [S720 to S730]. Thereafter, after the base station transmits a last data to the M2M device [S740], the base station can inform the M2M device of a multicast data transmission end indication via AAI-MTE-IND message, which is a sort of an MAC control message, or a multicast transmission end indication header. In this case, the AAI-MTE-IND message or the multicast transmission end indication header can include an M2M group ID and a FID [S750]. If the M2M device receives an indicator indicating the end of the multicast data transmission, the processor 120 of the M2M device controls the M2M device to enter the unavailable interval.

As mentioned in the foregoing description, when the base station transmits the multicast transmission end (MTE) signal on such the aforementioned timing as the condition 3, the MTE signal can be transmitted by a MAC control message form or a signaling header form. Table 3 shows an example of AAI-MTE-IND message format, which is a sort of the MAC control message, delivering the MTE signal.

TABLE 3

| Fields | Size (bits) | Description/Notes |
| --- | --- | --- |
| M2M Group ID | 15 | M2M group ID |
| FID | 4 | Flow ID for Multicast connection |
| Idle mode resuming Start Frame | 4 | Least Significant 4 bits of the frame number in which the devices resumes the idle mode by using the previous idle mode parameters |

Referring to Table 3, similar to Table 2, the AAI-MTE-IND MAC control message format can include the M2M group ID field, the FID field, the idle mode resuming start frame field, and the like. If the M2M device receives the AAI-MTE-IND message, the M2M device enters an idle mode in a frame indicated by the idle mode resuming start frame field.

The AAI-MTE-IND message can be used via a similar MAC control message in IEEE 802.16e system as well and the information entering in a manner of being included may be similar to each other. In this case, CID (connection identifier) is included instead of the MGID or the FID. The MAC control message (e.g., MOB_MTE-IND message) of IEEE 802.16e system reflected the above mentioned is as follows in Table 4.

Table 4 shows an example of a MOB_MTE-IND message in IEEE 802.16e system.

TABLE 4

| Fields | Size (bits) | Description/Notes |
|---|---|---|
| M2MCID | 16 | M2M connection identifier |
| Idle mode resuming Start Frame | 4 | Least Significant 4 bits of the frame number in which the devices resumes the idle mode by using the previous idle mode parameters |

Referring to Table 4, the MOB_MTE-IND message can include an M2M connection identifier (M2MCID) field and an idle mode resuming start frame field instead of the MGID or the FID. Similarly, if the M2M device receives the AAI-MTE-IND message, the M2M device enters an idle mode in a frame indicated by the idle mode resuming start frame field.

Meanwhile, if the AAI-MTE-IND message or the MOB_MTE-IND message is broadcasted, in case that an end indicator is informed to one or more multicast connections when the message is transmitted, a related MAC control message, a sub-header/extended header, and a signaling header can include one or more M2M group IDs (i.e., an M2M group ID (MGID) or an M2M connection identifier (M2MCID)).

Table 5 and Table 6 indicate an example of the AAI-MTE-IND message including one or more M2M group IDs indicating the end of the multicast data transmission and an example of the MOB_MTE-IND message, respectively (Table 5 is AAI-MTE-IND message format and Table 6 is the MOB_MTE-IND message).

TABLE 5

| Fields | Size (bits) | Description/Notes |
|---|---|---|
| For (i=0; i<NUM_MGID;i++) { M2M Group ID } | 12 | M2M group ID |

TABLE 6

| Fields | Size (bits) | Description/Notes |
|---|---|---|
| For (i=0; i<NUM_MGID;i++) { M2M CID } | 16 | M2M connection identifier |

Table 7 shows an example of a multicast transmission end indication header, which is a signaling header for delivering an MTE signal.

TABLE 7

| Syntax | Size (bits) | Description/Notes |
|---|---|---|
| Multicast Transmission End Indication Header ( ) { | | |
| FID | 4 | |
| Type | 5 | Multicast transmission end indication header |
| Length | 3 | |
| M2M Group ID | 15 | M2M group ID |
| FID | 4 | ID for Multicast connection |
| Idle resuming Start Frame | 4 | Least Significant 4 bits of the frame number in which the devices resumes the idle mode by using the previous idle mode parameters |

Referring to Table 7, a multicast transmission end indication header format can include a FID field, a type field for indicating the multicast transmission end indication header, a length field for indicating a length, an M2M group ID field, a FID field for indicating an FID corresponding to an ID for a multicast connection, and an idle mode resuming start frame field.

The AAI-MTE-IND message or the multicast transmission end indication header can be similarly applicable to 3GPP LTE and LTE-A system as well as IEEE 802.16 system.

Figure 8:
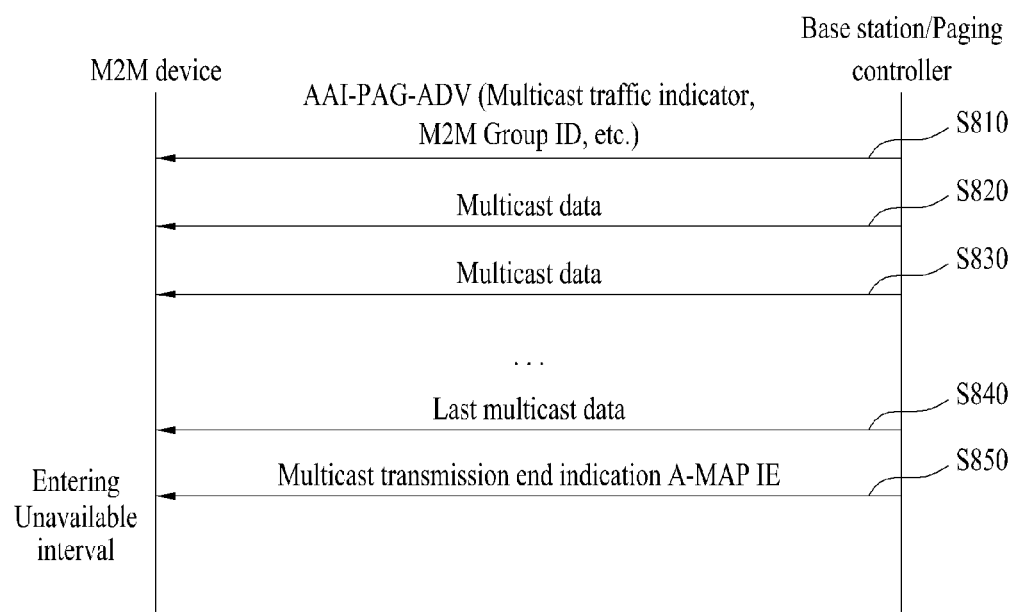
FIG. 8 is a diagram of a different example of a multicast data transmission between an M2M device and a base station according to one embodiment of the present invention.

FIG. 8 is a diagram of a different example of a multicast data transmission between an M2M device and a base station according to one embodiment of the present invention.

Referring to FIG. 8, the M2M device in an idle mode can receive a multicast traffic indicator (e.g. action code=0b10) indicating a multicast traffic transmission and a paging message including group information (e.g., M2M group ID) where the multicast traffic (or multicast data) is received from a base station [S810]. In this case, if the received M2M group ID information corresponds to the group where the M2M device belongs, the processor 120 of the M2M device controls the M2M device to standby to receive the multicast traffic without a network reentry and the M2M device can receive the multicast traffic [S820 to S830]. Thereafter, after the base station transmits a last data to the M2M device [S840], the base station can transmit a multicast data transmission end indication signal (MTE signal) in a form of a physical layer signaling [S850]. The base station can transmit an MTE indicator to an M2M device in a form of an A-MAP IE, which is a downlink control channel. If the M2M device receives an indicator indicating the end of the multicast data transmission, the processor 120 of the M2M device controls the M2M device to enter an unavailable interval.

Table 8 shows an example of a multicast transmission end indication A-MAP IE format.

TABLE 8

| Syntax | Size (bits) | Description/Notes |
|---|---|---|
| Multicast Transmission End Indication A-MAP IE ( ) { | | |
| Type | 4 | |
| M2M Group ID | TBD | M2M group ID where Devices belong |
| FID | 4 | ID for Multicast connection |
| Idle mode resuming Start Frame | 4 | Least Significant 4 bits of the frame number in which the devices resumes the idle mode by using the previous idle mode parameters |

Referring to Table 8, a multicast transmission end indication A-MAP IE can include an M2M group ID field for indicating an M2M group ID where an M2M device belongs, an FID field for indicating an ID for a multicast connection, and an idle mode resuming start frame field. The multicast transmission end indication A-MAP IE can be transmitted in a burst such as a last multicast data, in an identical frame, or in a previous timing point. A start frame indicates a frame that an M2M device stops receiving a multicast data and enters an unavailable interval.

Meanwhile, a base station can transmit a downlink control channel (e.g., A-MAP IE form) to the M2M device as a physical layer signaling in a manner of including an MTE indicator into the downlink control channel. For instance, the base station includes an indicator indicating that a corresponding data is the last data in the MAP IE, which is configured to allocate a downlink resource of the last multicast data. If the corresponding data is the last data, a corresponding bit can be configured by 1 for example. As an example of the MAP IE, there may exist a broadcast assignment A-MAP IE.

A Table in the following shows an example of a broadcast assignment A-MAP IE to transmit an M2M multicast data and an indicator for indicating the last multicast data is included as well.

Figure 9:
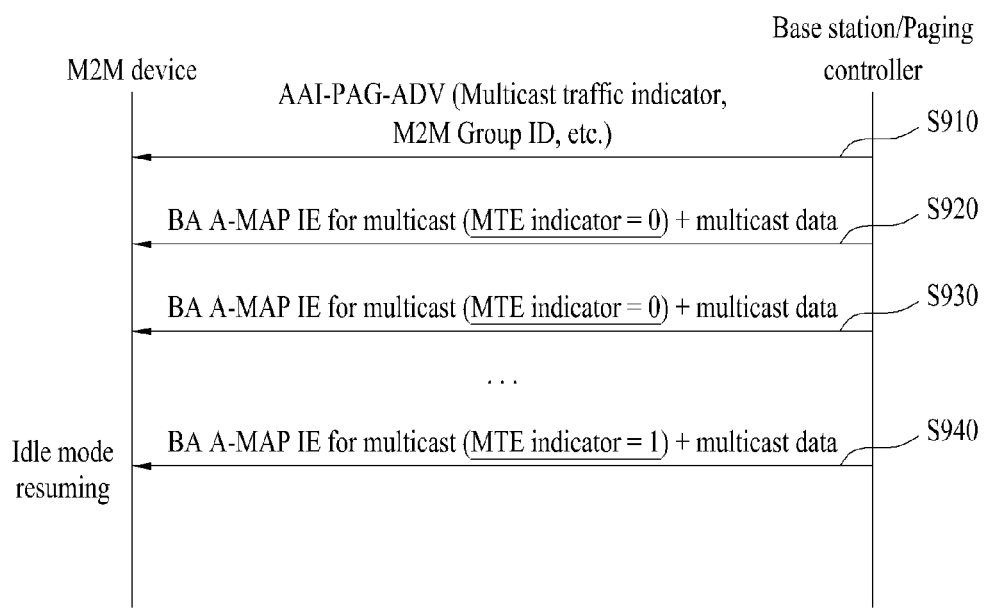
FIG. 9 is a diagram of a different example of a multicast data transmission between an M2M device and a base station according to one embodiment of the present invention.

FIG. 9 is a diagram of a different example of a multicast data transmission between an M2M device and a base station according to one embodiment of the present invention.

Referring to FIG. 9, the M2M device in an idle mode can receive a multicast traffic indicator (e.g. action code=0b10) indicating a multicast traffic transmission and a paging message including group information (e.g., M2M group ID) where the multicast traffic (or multicast data) is received from a base station [S910]. In this case, if the received M2M group ID information corresponds to the group where the M2M device belongs, the processor 120 of the M2M device controls the M2M device to standby to receive the multicast traffic without a network reentry and the M2M device can receive a multicast data and a broadcast assignment A-MAP IE (BA A-MAP IE) [S920]. In this case, the MTE indicator included in the broadcast assignment A-Map IE is set to 0 and indicates that the multicast data is continuously transmitted. Thereafter, the base station transmits the multicast data and the broadcast assignment A-MAP IE to the M2M device [S930]. In this case, the MTE indicator included in the broadcast assignment A-Map IE is set to 0 and can indicate that the multicast data is continuously transmitted as well.

While repeating the multicast data transmission, the base station transmits the broadcast assignment A-MAP IE including the multicast data and the MTE indicator (in this case, the MTE indicator is set to 1) for indicating the last multicast transmission to the M2M device [S940]. Having received the broadcast assignment A-MAP IE including the multicast data and the MTE indicator for indicating the last multicast transmission, the M2M device enters an idle mode again.

Table 9 shows an example of the broadcast assignment A-MAP IE.

TABLE 9

| Syntax | Size (bit) | Description/Notes |
|---|---|---|
| Broadcast_Assignment_A-MAP_IE( ) { | | |
| A-MAP IE Type | 4 | Broadcast Assignment A-MAP IE |
| Function Index | 2 | 0b00: This IE carries broadcast assignment information |
| | | 0b01: This IE carries handover ranging channel allocation information |
| | | 0b10: This IE carries multicast assignment information |
| | | 0b11: This IE carries multicast assignment information for M2M application |
| ... | | |
| } else if {Function Index == 0b11} { | | |
| Burst Size | 6 | Burst size as indicated in the first 39 entries inTable 958. |
| Resource Index | 11 | 512 FFT size: 0 in first 2 MSB bits + 9 bits for resource index |
| | | 1024 FFT size: 11 bits for resource index |
| | | 2048 FFT size: 11 bits for resource index |
| | | Resource index includes location and allocation size. |
| Long_TTI_Indicator | 1 | Indicates number of AAI subframes spanned by the allocated resource. |
| | | 0b0: 1 AAI subframe (default TTI) |
| | | 0b1: 4 DL AAI subframe for FDD or all DL AAI subframes for TDD (long TTI) |
| multicast transmission end indicator | 1 | Indicates whether the data indicated by this A-MAP is the last data. |
| M2M group ID | 15 | — |
| } | | |

Referring to Table 9, the broadcast assignment A-MAP IE can include an A-MAP IE type field for indicating an A-MAP IE type and a Function index field for indicating a function of the broadcast assignment A-MAP IE. If the Function index field indicates that the multicast assignment A-MAP IE is for an M2M application, the broadcast assignment A-MAP IE can further include the information necessary for resource allocation of the multicast data (e.g., a burst size field, a resource index field, a long_TTI_indicator field, and the like), a multicast transmission end indicator (i.e., an indicator for indicating the last multicast data transmission) field, and an M2M group ID field for indicating an M2M group ID.

In case of transmitting the last multicast data, the multicast transmission end indicator field of the broadcast assignment A-MAP IE is set to 1 and if the M2M device receives the broadcast assignment A-MAP IE to which the multicast transmission end indicator field (MTE indicator) is set to 1, the M2M device receives the last multicast data and immediately enters an idle mode or an unavailable interval. This method has a merit in that the M2M device does not perform an unnecessary buffering for different OFDMA symbols until the M2M device completes a decoding for an MAC control message including an MPDU (MAC protocol data unit) for the multicast data and the multicast transmission end indicator or an extended header compared to a case that the multicast transmission end indicator is transmitted in a form of the MAC control message or the extended header. In particular, in this case, there is a merit in that buffering the OFDM symbols stops in the subframe in which the last multicast data is included and although the decoding for the multicast data is not completed, it is not necessary to buffer OFDM symbols in a next subframe.

Although it is described that a bit size of an M2M group ID (MGID) is 12 bits or 15 bits in the aforementioned various message formats, the message format described as the MGID is 12 bits can be modified to 15 bits. On the contrary, the message format described as the MGID is 15 bits can be modified to 12 bits. And, since the MGID is just used to identify groups of the M2M devices, the MGID is not restricted to 12 bits or 15 bits.

In the foregoing description, various embodiments regarding the data transmission between the M2M device and the base station are explained. The base station can provide a multicast service for a M2M device group, which shares a downlink multicast service flow and the base station initiates an establishment of the service flow using a DSA procedure. When the service flow is established, the service flow is assigned by an M2MCID, which uniquely identifies the service flow. The M2M device should possess (or maintain) the identifiers in an idle mode. In case of signaling the DSA, the base station can provide the information on mapping between the M2MCID and the service flow to the M2M device. In case of a DSC (dynamic service change) procedure or a network reentry, the base station can change the mapping using an M2MCID update TLV.

The base station can provide a multicast service for M2M devices in an idle mode without a request of a network reentry of an M2M device. Before transmitting a downlink multicast data, the base station can transmit a paging message including a multicast traffic indication to the M2M devices in a paging listening interval of the M2M devices. If the M2M device receives the paging message for indicating a multicast traffic reception without a network reentry in the paging listening interval, the paging message does not include a multicast transmission start time TLV and it is necessary for the M2M device to start to receive the downlink multicast data without terminating the idle mode.

The multicast transmission start time TLV can be included in the paging message to indicate a timing of transmitting the downlink multicast data, which is transmitted by the base station. A value of the multicast transmission start TLV is less than a start time of a next paging listening interval of the M2M device receiving the paging message (e.g., MOB_PAG-ADV message, AAI-PAG-ADV message). The M2M device can perform a power down operation until the frame indicated by the multicast transmission start time TLV via the paging message (e.g., MOB_PAG-ADV message, AAI-PAG-ADV message). When the multicast data transmission is completed, the base station notifies the M2M device group of the end of multicast data transmission in a manner of transmitting a message (e.g., MOB_MTE-IND message, AAI-MTE-IND message) for indicating the end of the multicast transmission. If the M2M device receives the message (e.g., MOB_MTE-IND message, AAI-MTE-IND message) for indicating the end of the multicast transmission, the M2M device can enter the paging unavailable interval.

Table 10 shows an example of a M2M device group paging parameter.

TABLE 10

| Name | Type | Length | Value | Scope |
|---|---|---|---|---|
| M2M device group paging parameter | 156 | variable | Compound TLV to be used in M2M device group paging operation | MOB_PAG-ADV |

The M2M device group paging parameter TLV in Table 10 can be included in a paging message (e.g., MOB_PAG-ADV message, AAI-PAG-ADV message).

Table 11 shows a TLV element shown in each M2M device group paging parameter TLV.

TABLE 11

| Name | Type | Length | Value |
|---|---|---|---|
| M2MCID | 156.1 | 2 | Bits 0-14: Indicates M2M device group ID for which the multicast traffic is scheduled<br>Bit 15: Padding, Will be set to 0 |
| Action code | 156.2 | 1 | Bit 0-1: Indicates Action code for the M2M device group ID<br>0b00-Performing network reentry<br>0b01-Performing location update<br>0b10-Receiving multicast traffic without requiring network reentry<br>0b11-Re-assignment of M2MCID<br>Bits 2-7: Padding, Will be set to 0 |

Table 12 shows a TLV element shown in each M2M device group paging parameter TLV in case that an action code TLV value in Table 11 is set to 0b10.

TABLE 12

| Name | Type | Length | Value |
|---|---|---|---|
| Multicast transmission start time (MTST) | 156.3 | 1 | Least significant 8 bits of the frame number in which the BS starts sending DL multicast data |

The base station transmits the message (e.g., MOB_MTE-IND message or AAI-MTE-IND message) for indicating the end of the multicast transmission to the M2M device group to indicate the end of the multicast transmission by using a broadcast or multicast scheme and an M2M management CID can be used to transmit the MOB_MTE-IND message. If a multicast SA is configured for the M2M device group, the message for indicating the end of the multicast transmission is encrypted using a configured multicast SA. A physical (PHY) burst together with a MAC PDU, which carries the message for indicating the end of the multicast transmission, is indicated by an M2MCID in downlink control information (e.g., DL MAP). In a MAC PDU header, a CID field is set with a different random M2MCID except the M2MCID assigned to the M2M device and an EC indicates whether the MOB_MTE-IND message or the AAI-MTE-IND message is encrypted by 0 or 1. In case that the MOB_MTE-IND message or the AAI-MTE-IND message is encrypted, the multicast SA corresponding to the M2M device group, which is identified in the downlink control information (e.g., DL MAP) by the M2MCID, is used for decoding the MOB_MTE-IND message or the AAI-MTE-IND message. When the M2M device receives the MOB_MTE-IND message or the AAI-MTE-IND message in an idle mode, the M2M device can enter the paging unavailable interval.

Table 13 shows an example of an MOB_MTE-IND format.

TABLE 13

| Syntax | Size | Notes |
|---|---|---|
| MOB_MTE_IND_Message_Format( ) { | | |
| Management message type=110 | 8 | |
| M2MCID | 16 | M2MCID related to the multicast traffic. |

TABLE 13-continued

| Syntax | Size | Notes |
|---|---|---|
| } | | The same M2MCID shall be used for the multicast service flow of all the M2M service in the M2M device group |

While the above mentioned is described as applied to a multicast data, it can be applied to a unicast data, a broadcast data, and the like as well. And, although the above mentioned describes the multicast data transmission between the m2M device and the base station, it can be applied to a HTC (human type communication) device (i.e., a mobile terminal) as well.

Figure 10:
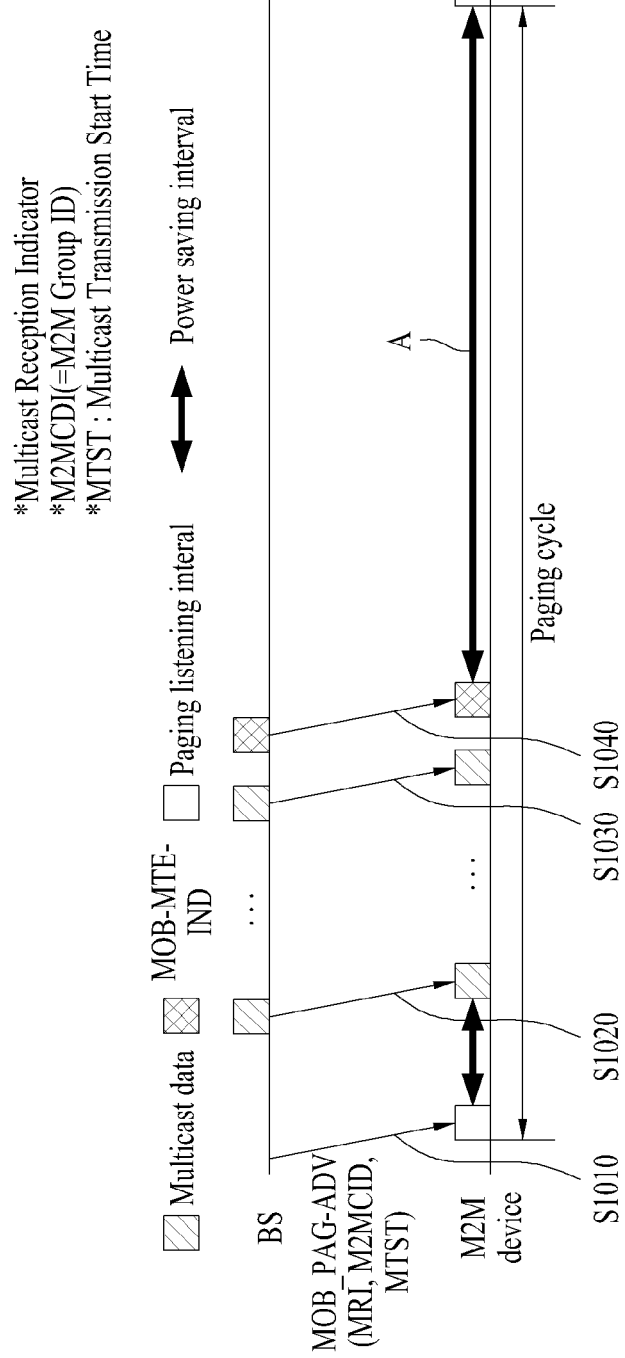
FIG. 10 is a diagram of a different example of a multicast data transmission between an M2M device and a base station according to one embodiment of the present invention.

FIG. 10 is a diagram of a different example of a multicast data transmission between an M2M device and a base station according to one embodiment of the present invention.

Referring to FIG. 10, a base station can transmit a paging message (e.g., MOB_PAG-ADV message or AAI-PAG-ADV message) to an M2M device [S1010]. The paging message (e.g., MOB_PAG-ADV message or AAI-PAG-ADV message) can be transmitted in a manner of including a multicast reception indicator (MRI), an M2MCID (or M2M group ID) information, and a multicast transmission start time (MTST) information. In this case, the MRI is an indicator for indicating to receive a multicast and the MTST indicates a starting point of multicast transmission.

Subsequently, the base station can perform an operation of transmitting the multicast data to the M2M devices [S1020/S1030]. In particular, in order to reduce power consumption of the M2M devices in an idle mode, when the base station judges that the multicast transmission is completed, the base station can transmit the MOB_PAG-ADV message or the AAI-PAG-ADV message (i.e., multicast data transmission end signal) to the M2M devices [S1040]. This message makes the M2M device immediately enter an unavailable interval and can reduce the power consumption of the M2M device. In particular, the M2M device can operate in a power saving mode from a point of receiving the MOB_PAG-ADV message or the AAI-PAG-ADV message to a remaining paging cycle (A interval) based on the MOB_PAG-ADV message or the AAI-PAG-ADV message received from the base station.

Figure 11:
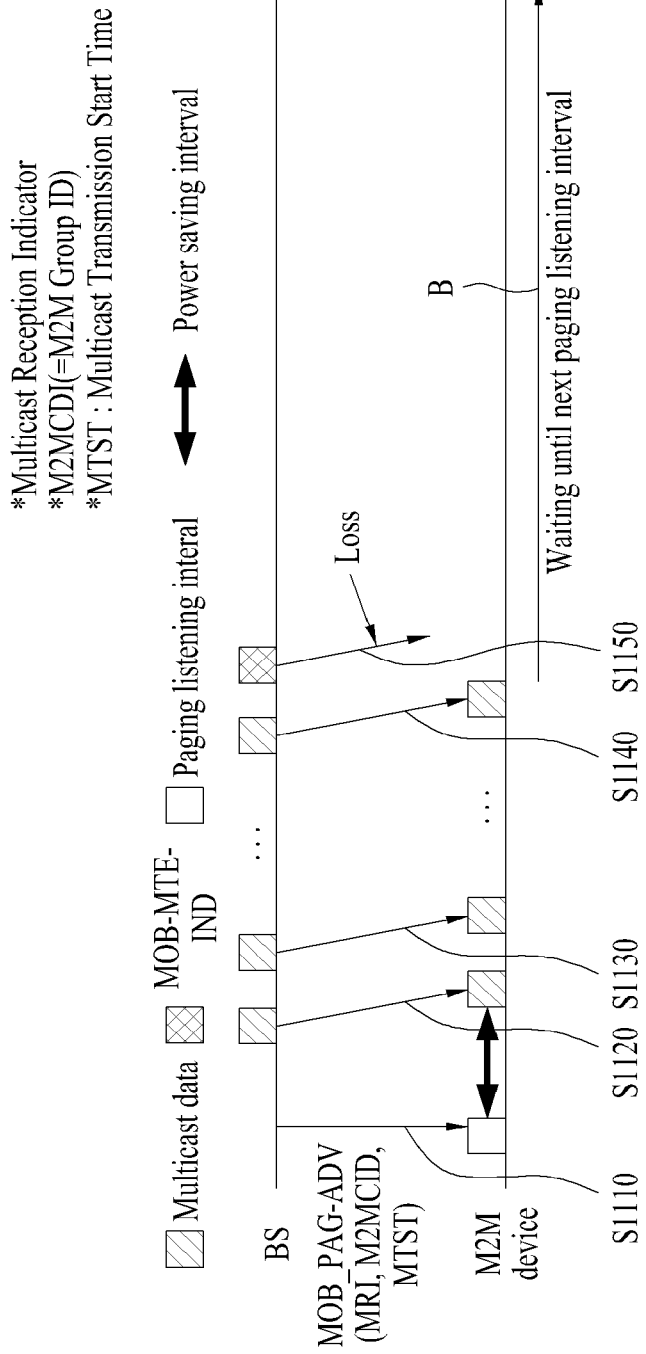
FIG. 11 is a diagram of a different example of a multicast data transmission between an M2M device and a base station according to one embodiment of the present invention.

FIG. 11 is a diagram of a different example of a multicast data transmission between an M2M device and a base station according to one embodiment of the present invention.

Referring to FIG. 11, similar to FIG. 10, a base station can transmit a paging message (e.g., MOB_PAG-ADV message or AAI-PAG-ADV message) to an M2M device S1110. The paging message (e.g., MOB_PAG-ADV message or AAI-PAG-ADV message) can be transmitted in a manner of including a multicast reception indicator (MRI), an M2MCID (M2M group ID) information, and a multicast transmission start time (MTST) information.

Subsequently, the base station can perform an operation of transmitting the multicast data to the M2M devices [S1120/S1130/S1140]. In particular, in order to reduce power consumption of the M2M devices in an idle mode, when the base station judges that the multicast transmission is completed, the base station can transmit the MOB_PAG-ADV message or the AAI-PAG-ADV message (i.e., multicast data transmission end signal) to the M2M devices [S1150]. Yet, if the MOB_PAG-ADV message or the AAI-PAG-ADV message from the base station is lost, the M2M device fails to successfully receive the message and cannot decode the message, unnecessary power consumption can still occur in the M2M devices. In particular, the unnecessary power can be consumed from a point of a last multicast transmission (or reception) to a next paging listening interval (i.e., B interval).

And, in case that the base station has not received a multicast data end signal from a network entity (e.g., an MCBCS server or an M2M server) or in case that a point of the multicast transmission end cannot be determined since a corresponding traffic has periodicity, the MOB_MTE-IND message or the AAI-MTE-IND message for indicating the multicast data transmission end cannot be transmitted to the M2M device. Then, the processor 120 of the M2M device control the M2M device to maintain an active state to receive a multicast data until a next paging listening interval and the M2M device maintains the active state.

In order to solve the aforementioned problem, the present invention proposes a multicast traffic reception (MTR) timer and defines the MTR timer.

The base station configures a multicast traffic reception timer for a corresponding multicast connection (i.e., M2MCID) in a DSA procedure to establish a multicast data connection and informs the M2M device of corresponding timer information.

Figure 12:
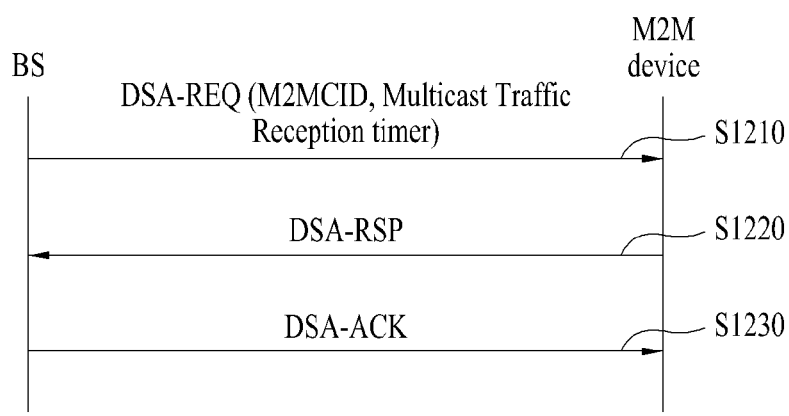
FIG. 12 is a diagram for an example of performing a DSA procedure initiated by a base station (BS-initiated)

FIG. 12 is a diagram for an example of performing a DSA procedure initiated by a base station (BS-initiated).

Referring to FIG. 12, the base station can initiate a DSA procedure and can transmit a dynamic service additional request message (e.g., AAI-DSA-REQ message or DSA-REQ message) to the M2M device [S1210]. In this case, the dynamic service additional request message (e.g., the DSA-REQ message) can be transmitted in a manner of including M2MCID (or M2M group ID) or a multicast traffic reception timer. The M2M device can transmit a dynamic service additional response message (e.g., AAI-DSA-RSP message or DSA-RSP message) to the base station in response to the dynamic service additional request of the base station [S1220]. Subsequently, the base station can transmit a DSA-ACK message to the M2M devices in confirmation response to the dynamic service additional response message (e.g., the DSA-RSP message) for example [S1230].

As mentioned in the foregoing description, in the DSA procedure initiated by the base station, the base station can transmit the multicast traffic reception timer to the M2M device in a manner of including the multicast traffic reception timer in the dynamic service additional request message (e.g., DSA-REQ message in IEEE 802.16e system, AAI-DSA-REQ message in IEEE 802.16m system).

Table 14 shows an example of the multicast traffic reception timer included in the dynamic service additional request/dynamic service change request message (e.g., DSA-REQ/DSC-REQ message or AAI-DSC-REQ/AAI-DSC-REQ).

TABLE 14

| Name | Type | Length | Value | Scope |
|---|---|---|---|---|
| M2M Multicast Traffic Reception timer | [145/146].58 | 1 | The maximum time interval that M2M devices in idle mode wait to receive the M2M multicast data, in unit of frames (0~255). | DSA-REQ/DSC-REQ |

Referring to Table 14, the M2M multicast traffic reception timer indicates an example of the maximum time interval in unit of frames (0~255) that M2M devices in idle mode wait to receive the M2M multicast data.

Although the DSA-REQ/DSC-REQ procedure initiated by the base station (BS-initiated) is explained in FIG. 12, the procedure can be progressed by a procedure initiated by the M2M device (M2M device-initiated) as well. In particular, if the M2M device transmits the DSA-REQ/DSC-REQ message, the base station may deliver the MTR timer information to the M2M device in a manner of including the MTR timer information in the DSA-RSP/DSC-RSP message or AAI-DSA-RSP/AAI-DSC-RSP message. Then, the M2M device can perform an MTR timer operation according to the received MTR timer information.

Figure 13:
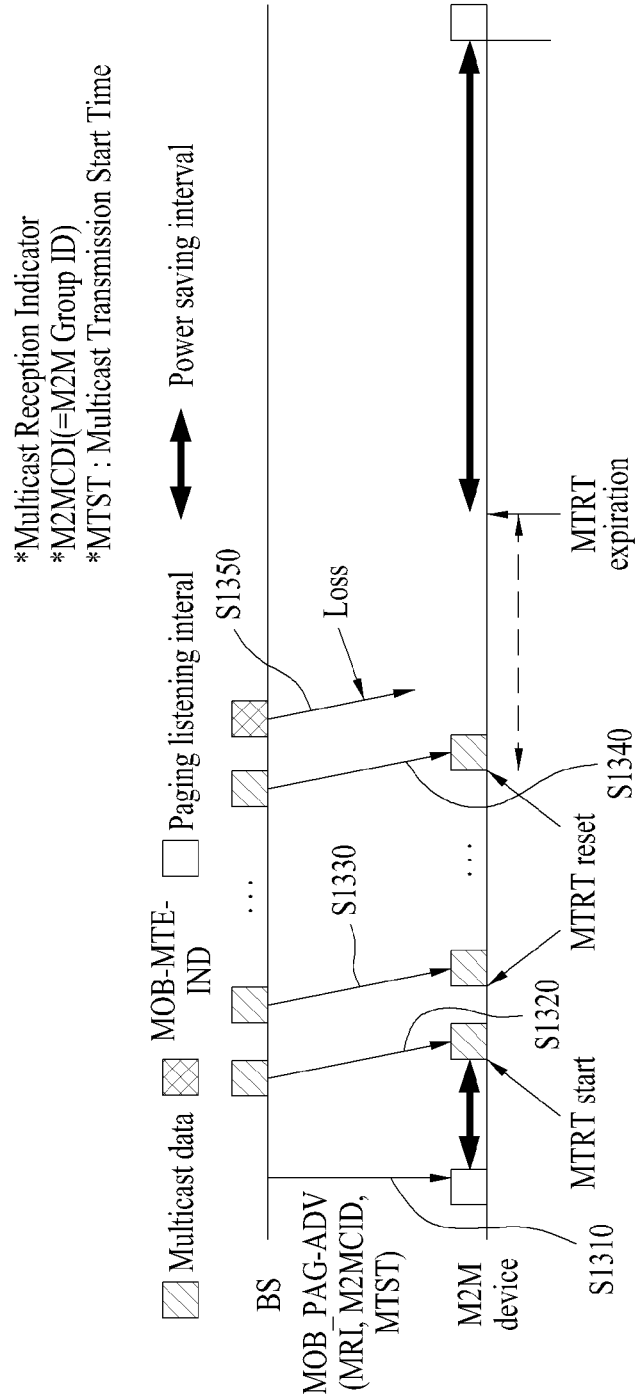
FIG. 13 is a diagram of a further different example of a multicast data transmission between an M2M device and a base station according to one embodiment of the present invention.

FIG. 13 is a diagram of a further different example of a multicast data transmission between an M2M device and a base station according to one embodiment of the present invention.

The M2M device to which the M2M multicast traffic reception timer is assigned via the DSA/DSC procedure maintains a corresponding timer and uses the corresponding timer when the M2M device starts to receive a multicast data. While maintaining the multicast traffic reception (MTR) timer, the M2M device in idle mode can receive a paging message (e.g., MOB_PAG-ADV message or AAI-PAG-ADV message) including a multicast reception indicator for indicating a multicast traffic reception [S1310]. In this case, the processor 120 of the M2M device starts to use the corresponding timer (MTR timer). In this case, the paging message can be transmitted in a manner of including M2MCID (or M2M group ID) and the information for indicating a multicast transmission start time (MTST).

As mentioned earlier, if the multicast traffic start time (MTST) TLV is included in the paging message, the processor 120 of the M2M device starts the MTR timer on a timing point pointed by the MTST TLV (MTRT start). In this case, the timing point pointed by the MTST TLV may correspond to a timing point for receiving a multicast data [S1320]. If the MTST TLV is not included in the paging message, the processor 120 of the M2M device starts the MTR timer as soon as the paging message is received.

If the M2M device receives the multicast data for a multicast connection corresponding to the MTR timer before the MTR timer is expired [S1330/S1340], the processor 120 of the M2M device restarts (or resets) the MTR timer.

If the M2M device receives a multicast end signal (e.g., MOB_MTE-IND message of AAI-MTE-IND message) for a connection identical to the multicast connection mapped to the MTR timer or corresponding to the MTR timer before the MTR timer is expired [S1350], the processor 120 of the M2M device stops the MTR timer and enters a paging unavailable interval of idle mode. And, the MTR timer can be expired without receiving the multicast end signal (e.g., MOB_MTE-IND message of AAI-MTE-IND message) for the connection identical to the multicast connection mapped to the MTR timer or corresponding to the MTR timer or a mapped multicast data (due to a reason of loss and the like). If the corresponding MTR timer is expired like the above mentioned, the M2M device enters the paging unavailable interval of idle mode. As mentioned above, the M2M device can reduce power consumption by entering the paging unavailable interval of idle mode when the MTR timer is expired.

The processor 120 of the M2M device can control the M2M device to stop receiving a multicast data according to whether the multicast transmission start time (MTST) is included in the paging message, whether the base station informs the M2M device of the multicast transmission end signal (e.g., MOB_MTE-IND message or AAI-MTE-IND message) (it may be named an MTE indicator), whether a reliable multicast transmission is supported. Having judged the end of multicast data reception, the M2M device can perform an operation of power saving (e.g., power off). In the following description, the operation of the M2M device is explained in a manner of dividing the aforementioned cases into a case-by-case.

<Case 1: Reliable Transmission is Off, MTST is not Included in a Paging Message, and an MTE Indicator is not Used>

If the M2M device does not receive a multicast data in a specific period after a paging message is received (in particular, a timer T1 starts after the paging message is received, the T1 is expired since a multicast data is not received), the processor 120 of the M2M device immediately ends the multicast reception and controls the M2M device to operate in idle mode, thereby reducing power consumption of the M2M device.

Meanwhile, if the M2M device does not receive a concatenated multicast data in a specific period after a paging message is received (in particular, the timer T1 is reset on every reception of multicast data and the T1 is expired since a concatenated multicast data is not received), the processor 120 of the M2M device immediately ends the multicast reception and controls the M2M device to operate in idle mode, thereby reducing power consumption of the M2M device.

In particular, if the timer T1 is expired, the processor 120 of the M2M device ends the multicast reception and controls the M2M device to operate in idle mode. Then, the M2M device enters an idle mode.

<Case 2: Reliable Transmission is Off, MTST is not Included in a Paging Message, and an MTE Indicator is Used>

If the M2M device does not receive a multicast data or an MTE indicator in a specific period after a paging message is received (in particular, a timer T1 starts after the paging message is received and the T1 is expired before the MTE indicator is received), the processor 120 of the M2M device ends the multicast reception and controls the M2M device to operate in idle mode. Then, the M2M device enters an idle mode.

Meanwhile, if the M2M device does not receive a concatenated multicast data or the MTE indicator for a certain period after receiving a downlink multicast data after a paging message is received (in particular, the timer 1 starts after the paging message is received and the T1 is expired before the MTE indicator is received), the processor 120 of the M2M device ends the multicast reception and controls the M2M device to operate in idle mode. Then, the M2M device enters an idle mode.

If the MTE indicator is received, the processor 120 of the M2M device ends the multicast reception and controls the M2M device to operate in idle mode, thereby reducing power consumption of the M2M device.

<Case 3: Reliable Transmission is Off, MTST is Included in a Paging Message, and an MTE Indicator is not Used>

If the MTST is included in the paging message, the processor 120 of the M2M device can control the timer T1 to start on the MTST after the paging message is received and if a data is not received until the timer is expired (i.e., if the timer T1 is expired), the processor 120 of the M2M device ends the multicast reception and controls the M2M device to operate in idle mode. Then, the M2M device enters an idle mode.

Meanwhile, the processor 120 of the M2M device starts the timer T1 on the MTST after the paging message is received and if a multicast data is received before the timer is expired and a sequence number of MPDU/MSDU of the multicast data is out of order, the processor 120 of the M2M device immediately ends the multicast reception and can control the M2M device to operate in idle mode. In this case, the M2M device may transmit the received MPDU to an upper level.

If a multicast data is received on the MTST, the processor 120 of the M2M device can reset an end timer T1. If a multicast data is not received until the T1 is expired, the processor 120 of the M2M device ends the multicast reception and can control the M2M device to operate in idle mode. Then, the M2M device enters an idle mode.

If a multicast data is received on the MTST, the processor 120 of the M2M device resets the end timer T1 and if a multicast data is received before the T1 is expired and a sequence number of MPDU/MSDU of the multicast data is out of order, the processor 120 of the M2M device ends the multicast reception and can control the M2M device to operate in idle mode. Then, the M2M device enters an idle mode.

<Case 4: Reliable Transmission is Off, MTST is Included in a Paging Message, and an MTE Indicator is Used>

The processor 120 of the M2M device can control the timer T1 to start on the MTST after the paging message is received and if a multicast data or an MTE indicator is not received until the timer T1 is expired (i.e., if the timer T1 is expired), the processor 120 of the M2M device ends the multicast reception and controls the M2M device to operate in idle mode. Then, the M2M device enters an idle mode.

Meanwhile, the processor 120 of the M2M device starts the timer T1 on the MTST after the paging message is received and if a multicast data is received before the timer is expired and a sequence number of MPDU/MSDU of the multicast data is out of order, the processor 120 of the M2M device immediately ends the multicast reception and can control the M2M device to operate in idle mode. In this case, the M2M device may transmit the received MPDU to an upper level.

If a multicast data is received on the MTST, the processor 120 of the M2M device resets the end timer T1 and if a multicast data is not received until the T1 is expired, the processor 120 of the M2M device ends the multicast reception and controls the M2M device to operate in idle mode. Then, the M2M device enters an idle mode.

Meanwhile, if the MTE indicator is received, the processor 120 of the M2M device ends the multicast reception and controls the M2M device to operate in idle mode. Then, the M2M device enters an idle mode.

<Case 5: Reliable Transmission is on, MTST is not Included in a Paging Message, and an MTE Indicator is not Used>

If the M2M device does not receive a multicast data in a specific period after a paging message is received (in particular, a timer T1 starts after the paging message is received, the T1 is expired since a multicast data is not received), the processor 120 of the M2M device ends the multicast reception and controls the M2M device to operate in idle mode and the M2M device enters an idle mode.

Meanwhile, if the M2M device does not receive a concatenated multicast data in a specific period after a paging message is received (in particular, the timer T1 is reset on every reception of multicast data and the T1 is expired since a concatenated multicast data is not received), the processor 120 of the M2M device ends the multicast reception and can control the M2M device to operate in idle mode and the M2M device enters an idle mode.

In particular, if the timer T1 is expired, the processor 120 of the M2M device ends the multicast reception and the M2M device enters an idle mode.

<Case 6: Reliable Transmission is on, MTST is not Included in a Paging Message, and an MTE Indicator is Used>

If the M2M device does not receive a multicast data or an MTE indicator in a specific period after a paging message is received (in particular, a timer T1 starts after the paging message is received and the T1 is expired before the MTE indicator is received), the processor 120 of the M2M device can control the M2M device to immediately perform an error handling operation.

If the M2M device does not receive a concatenated multicast data or the MTE indicator for a certain period after receiving a downlink multicast data after a paging message is received (in particular, the timer 1 starts after the paging message is received and the T1 is expired before the MTE indicator is received), the processor 120 of the M2M device can control the M2M device to immediately perform an error handling operation.

If the M2M device receives the MTE indicator, the processor 120 of the M2M device immediately ends the multicast reception and can control the M2M device to operate in idle mode and the M2M device enters an idle mode.

<Case 7: Reliable Transmission is on, MTST is Included in a Paging Message, and an MTE Indicator is Used>

The processor 120 of the M2M device can control the timer T1 to start on the MTST after the paging message is received and if a multicast data or an MTE indicator is not received until the timer T1 is expired (i.e., if the timer T1 is expired), the processor 120 of the M2M device can control the M2M device to immediately perform an error handling operation.

Meanwhile, the processor 120 of the M2M device starts the timer T1 on the MTST after the paging message is received and if a multicast data is received before the timer is expired and a sequence number of MPDU/MSDU of the multicast data is out of order, the processor 120 of the M2M device can control the M2M device to immediately perform an error handling operation.

If a data is received on the MTST, the processor 120 of the M2M device reset the end timer T1. If a multicast data is not received until the timer T1 is expired, the processor 120 of the M2M device can control the M2M device to immediately perform an error handling operation.

And, if a data is received on the MTST, the processor 120 of the M2M device reset the end timer T1. If a sequence number of multicast data MPDU/MSDU, which is received before the T1 is expired, is out of order, the processor 120 of the M2M device can control the M2M device to immediately perform an error handling operation.

If the M2M device receives the MTE indicator, the processor 120 of the M2M device immediately ends the multicast reception and can control the M2M device to operate in idle mode and the M2M device enters an idle mode.

According to various embodiments proposed by the present invention described in the foregoing description, when a multicast cast data is transmitted to M2M devices, in particular, when a multicast data is transmitted to the M2M devices in idle mode, it is able to efficiently perform an end of reception of the multicast data, thereby reducing power consumption of the M2M device.

Although the embodiments of the present invention are explained using message formats used in IEEE 802.16m, 16e system, and the like, this is just an exemplary. The embodiments of the present invention can be applied to a message format of 3GPP LTE and LTE-A system performing an identical function although its title or name is different from the message formats of IEEE 802.16m, 16e system.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, a method of transmitting/receiving multicast-related information, which is transmitted/received by an M2M device in a wireless communication system and an apparatus therefor are industrially available for various wireless communication systems including 3GPP LTE, LTE-A, IEEE 802.16 and the like.

What is claimed is:

1. A method of receiving multicast data-related information by a machine to machine (M2M) device in a wireless communication system, the method comprising:
receiving a first message containing information related to an M2M multicast traffic reception timer from a base station;
receiving a paging message from the base station; and
starting, the M2M multicast traffic reception timer at a timing point indicated by the paging message, based on the first message and the paging message,
wherein the information related to the M2M multicast traffic reception timer comprises information on a time interval for which the M2M device waits to receive M2M multicast data.

2. The method of claim 1, wherein the first message comprises to a message for requiring a dynamic service addition or a message for requiring a dynamic service change.

3. The method of claim 2, wherein the message for requiring the dynamic service addition corresponds to an AAI-DSA-REQ message or a DSA-REQ message and wherein the message for requiring the dynamic service change corresponds to an AAI-DSC-REQ message or a DSC-REQ message.

4. The method of claim 1, wherein the timing point indicated by the paging message is a timing point on which the M2M multicast data is received.

5. The method of claim 1, further comprising:
receiving the M2M multicast data from the base station; and
restarting or resetting the M2M multicast traffic reception timer when the M2M multicast data is received.

6. The method of claim 1, further comprising:
receiving the M2M multicast data from the base station;
receiving an indicator indicating an end of transmission of the M2M multicast data from the base station; and
stopping the M2M multicast traffic reception timer based on the indicator before the M2M multicast traffic reception timer is expired.

7. The method of claim 6, further comprising:
entering a paging unavailable interval of an idle mode after stopping the M2M multicast traffic reception timer.

8. The method of claim 1, wherein an M2M multicast connection of the M2M multicast data is identical to an M2M multicast connection mapped to the M2M multicast traffic reception timer.

9. The method of claim 1, wherein if the M2M multicast traffic reception timer is expired, further comprising the step of entering a paging unavailable interval of an idle mode.

10. An machine to machine (M2M) device of receiving multicast data-related information in a wireless communication system, the M2M device comprising:
a receiver configured to receive a first message containing information related to an M2M multicast traffic reception timer and a paging message from a base station; and
a processor configured to control the M2M multicast traffic reception timer, to start at a timing point indicated by the paging message, based on the first message and the paging message,
wherein the information related to the M2M multicast traffic reception timer comprises information on a time interval for which the M2M device waits to receive M2M multicast data.

11. The M2M device of claim 10, wherein the first message comprises to a message for requiring a dynamic service addition or a message for requiring a dynamic service change.

12. The M2M device of claim 11, wherein the message for requiring the dynamic service addition corresponds to an AAI-DSA-REQ message or a DSA-REQ message and wherein the message for requiring the dynamic service change corresponds to an AAI-DSC-REQ message or a DSC-REQ message.

13. The M2M device of claim 10, wherein the receiver is configured to receive the M2M multicast data from the base station and wherein the processor is configured to control the M2M multicast traffic reception timer to be restarted or reset when the M2M multicast data is received.

14. The M2M device of claim 10, wherein the receiver is configured to receive the M2M multicast data from the base station and an indicator indicating an end of transmission of the M2M multicast data from the base station and,
wherein the processor is configured to stop the M2M multicast traffic reception timer based on the indicator before the M2M multicast traffic reception timer is expired.

15. The M2M device of claim 10, wherein an M2M multicast connection of the M2M multicast data corresponds is identical to an M2M multicast connection mapped to the M2M multicast traffic reception timer.

16. The M2M device of claim 15, wherein the processor is configured to control the M2M device to enter a paging unavailable interval of an idle mode after stopping the M2M multicast traffic reception timer.

17. The M2M device of claim 10, wherein if the M2M multicast traffic reception timer is expired, the processor is configured to control the M2M device to enter a paging unavailable interval of an idle mode.

* * * * *